US009001697B2

(12) United States Patent
Cha et al.

(10) Patent No.: US 9,001,697 B2
(45) Date of Patent: Apr. 7, 2015

(54) METHODS AND DEVICES FOR REPLACING AND CONFIGURING A ROUTER IN A NETWORK

(71) Applicant: Western Digital Technologies, Inc., Irvine, CA (US)

(72) Inventors: Derek Hee Jun Cha, Irvine, CA (US); Paul Chen, Huntington Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 174 days.

(21) Appl. No.: 13/716,014

(22) Filed: Dec. 14, 2012

(65) Prior Publication Data
US 2014/0169221 A1 Jun. 19, 2014

(51) Int. Cl.
*H04L 12/28* (2006.01)
*H04W 48/00* (2009.01)
*H04L 12/24* (2006.01)

(52) U.S. Cl.
CPC ........... *H04W 48/00* (2013.01); *H04L 41/0806* (2013.01); *H04L 41/0896* (2013.01)

(58) Field of Classification Search
CPC ..... H04L 41/0806; H04L 67/02; H04L 67/01; H04L 41/0813; H04L 41/046; H04L 41/0853; H04L 41/26; H04W 4/00; H04W 4/001; H04W 12/06
USPC ................. 370/230, 252, 254, 255, 328, 389; 709/200, 219, 221–226, 232
See application file for complete search history.

(56) References Cited

U.S. PATENT DOCUMENTS

| 6,499,054 | B1 | 12/2002 | Hesselink et al. |
| 6,732,158 | B1 | 5/2004 | Hesselink et al. |
| 6,912,223 | B1 | 6/2005 | Sloane |
| 6,917,626 | B1 | 7/2005 | Duvvury |
| 7,080,141 | B1 | 7/2006 | Baekelmans et al. |
| 7,120,692 | B2 | 10/2006 | Hesselink et al. |
| 7,245,618 | B2 | 7/2007 | Ito et al. |
| 7,246,144 | B2 * | 7/2007 | Walsh et al. ................. 709/200 |
| 7,454,443 | B2 | 11/2008 | Ram et al. |
| 7,467,187 | B2 | 12/2008 | Hesselink et al. |
| 7,526,536 | B2 | 4/2009 | Bhogal et al. |
| 7,546,353 | B2 | 6/2009 | Hesselink et al. |
| 7,565,418 | B2 | 7/2009 | Ferrari et al. |

(Continued)

FOREIGN PATENT DOCUMENTS

WO 2005022321 3/2005

OTHER PUBLICATIONS

International Search Report and Written Opinion dated Jan. 14, 2014 for related PCT Application No. PCT/US2013/062755, pp. 13.

*Primary Examiner* — Afsar M Qureshi

(57) ABSTRACT

A method of replacing a first router with a second router within a network may comprise placing the second router in client mode within the network such that the second router is not configured to route network traffic and is configured to search for a network access point provided by the first router. A protocol may then be invoked on the first and second routers, the protocol being configured to enable an exchange of the network name and password information from the first router to the second router in client mode. The second router, in client mode, may be configured according to the obtained network name and password information. The second router may then be switched from client mode back to router mode and enabled to route network traffic on the network. The first router may then be replaced with the second router.

23 Claims, 6 Drawing Sheets

(56) References Cited

U.S. PATENT DOCUMENTS

| | | |
|---|---|---|
| 7,587,467 B2 | 9/2009 | Hesselink et al. |
| 7,600,036 B2 | 10/2009 | Hesselink et al. |
| 7,623,515 B2 | 11/2009 | Breuer et al. |
| 7,631,045 B2 | 12/2009 | Boerries et al. |
| 7,633,855 B2 | 12/2009 | Singh et al. |
| 7,788,404 B2 | 8/2010 | Hesselink et al. |
| 7,917,628 B2 | 3/2011 | Hesselink et al. |
| 7,934,251 B2 | 4/2011 | Hesselink et al. |
| 8,004,791 B2 | 8/2011 | Szeremeta et al. |
| 8,156,207 B2 | 4/2012 | Wood et al. |
| 8,255,661 B2 | 8/2012 | Karr et al. |
| 8,285,965 B2 | 10/2012 | Karr et al. |
| 8,316,116 B2 * | 11/2012 | Hamilton et al. .............. 709/221 |
| 8,326,962 B2 * | 12/2012 | Lo ................................. 709/223 |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 2002/0161867 A1 | 10/2002 | Cochran et al. |
| 2005/0144195 A1 | 6/2005 | Hesselink et al. |
| 2005/0144200 A1 | 6/2005 | Hesselink et al. |
| 2005/0265257 A1 * | 12/2005 | Masuda ........................ 370/254 |
| 2006/0277299 A1 | 12/2006 | Baekelmans et al. |
| 2007/0022185 A1 | 1/2007 | Hamilton et al. |
| 2007/0028000 A1 | 2/2007 | Ebbesen et al. |
| 2007/0111568 A1 * | 5/2007 | Ferrari et al. ................. 439/131 |
| 2007/0268506 A1 | 11/2007 | Zeldin |
| 2007/0268516 A1 | 11/2007 | Bugwadia et al. |
| 2009/0073990 A1 | 3/2009 | Patil et al. |
| 2009/0147700 A1 | 6/2009 | Sewall et al. |
| 2009/0198800 A1 | 8/2009 | Dighe et al. |
| 2009/0304010 A1 * | 12/2009 | Kurebayashi et al. ........ 370/401 |
| 2010/0111059 A1 * | 5/2010 | Bappu et al. .................. 370/338 |
| 2010/0199344 A1 | 8/2010 | Ling et al. |
| 2012/0036041 A1 | 2/2012 | Hesselink |
| 2012/0120934 A1 | 5/2012 | Cho |
| 2012/0213158 A1 * | 8/2012 | Birlik et al. ................... 370/328 |
| 2012/0239916 A1 | 9/2012 | Malasani |
| 2013/0024685 A1 * | 1/2013 | Kolavennu et al. ........... 713/153 |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |

* cited by examiner

US 9,001,697 B2

METHODS AND DEVICES FOR REPLACING AND CONFIGURING A ROUTER IN A NETWORK

BACKGROUND

Conventionally, it may be difficult for less technologically-savvy end users to set up a new router or replace an older router with a newly-purchased router. Even for technologically-sophisticated users, however, the present expectation is that even complex devices such as routers will install and work right out of the box, in the same manner as a common household appliance.

The problem is compounded when the user has forgotten the network name (the Service Set Identifier, hereafter, "SSID") and/or the router password. Wi-Fi Protected Setup (hereafter, "WPS") allows users to add new devices to a network without typing long passphrases. However, the WPS protocol has not been effective in all situations. For example, when a user wishes to replace an older router with a newer model, there is no established mechanism enabling the new router to be configured using the older router's settings (the older router's SSID and the router password).

These difficulties may cause frustration during the initial setup of the router. If the user is unable to properly configure their new purchase, they may resort to costly calls to tech support and may ultimately return the router to the point of purchase. In turn, these difficulties could engender a negative perception of the quality and user-friendliness of the manufacturer of the router.

DETAILED DESCRIPTION

According to one embodiment, even a technological neophyte may successfully set up a new router as either a drop-in replacement for an older router or as a range-extending AP. The user need not remember the network's SSID or the router's password as, according to one embodiment, the WPS protocol is invoked, while the router is placed in "client mode", to enable the router to learn the SSID and password of the router it is to replace. The new router may then be switched back to router mode (replacement case) or left in client mode (AP case). Indeed, one embodiment enables any user to replace an older router with a newly-purchased router, while keeping the older router's settings, such as SSID and password. At the end of the process, according to one embodiment, the new router may be configured in router mode; that is, as a drop-in replacement for the older router. Similarly, according to one embodiment, the router may be configured as an AP and configured according to the SSID and password of the older router.

Figure 1:
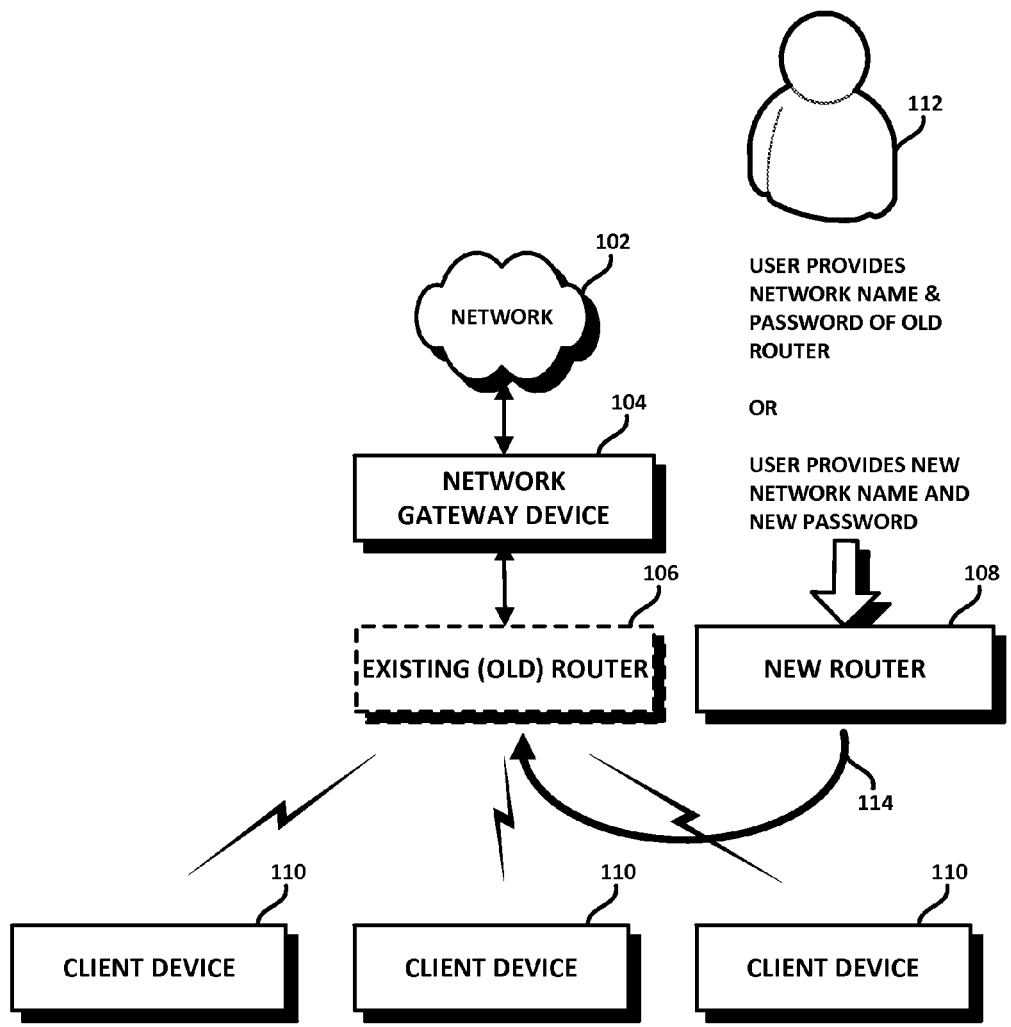
FIG. 1 is a block diagram illustrating aspects of a conventional method of replacing an older router with a newer router.

FIG. 1 is a block diagram illustrating aspects of a conventional method of replacing an older router with a newer router. As shown therein, a network gateway 104, such as a modem, may be coupled to a network 102, which may comprise the Internet. Coupled to the first router 106 may be a number of client computing devices such as shown at 110. The client computing devices may comprise desktop computers, laptops, tablet computing devices, telephones and the like. As shown in FIG. 1, an existing or old router 106 is to be replaced with a new or newer router 108. Conventionally, a user 112 must either provide the network name (SSID) and the password of the existing router 106 or must create a new network and provide a new network name and password to the new router 108. Assuming that process is carried out successfully, the existing router 106 may be replaced with the new router 108. As is often the case, however, the user may have forgotten the network name and the password stored in the older router, and may lack the technological know-how to look up and/or reset such information. However, this may pose difficulties for technologically unsophisticated users, who may not know how to provide the requested values for the SSID and passwords. Moreover, if a new network name and password are provided, all client devices accessing the network will have to be re-configured to access the new network. This is time-consuming and may be such a daunting task for some users that the prospect thereof may cause them to forgo or delay purchasing a new router.

Figure 2:
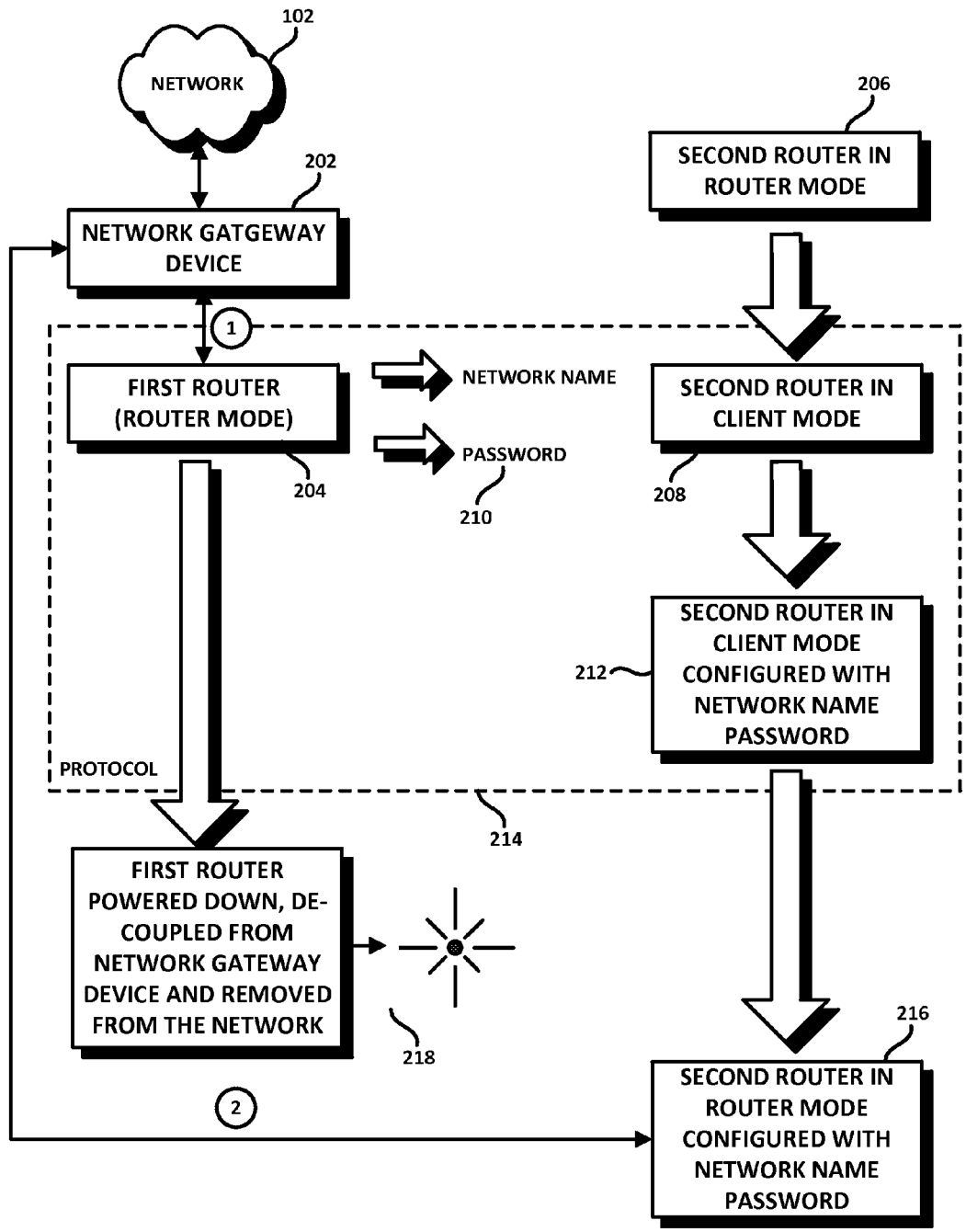
FIG. 2 is a block diagram illustrating aspects a replacing a first router with a second router within a network, according to one embodiment.

FIG. 2 is a block diagram illustrating aspects of a method for replacing a first router with a second router within a network, according to one embodiment. As shown therein, a network gateway device 202 may be coupled to a network 102 that may comprise, for example, the Internet. The network gateway device 202 may comprise, for example, a modem. A first router 204 may be coupled to the network gateway device 202, as shown at (1). For example, the first router 204 may be an existing, older router. A second router 206 may also be provided. The second router 206 may, for example, be a new or newer router. For example, the second router 206 may be a newly-purchased router, right out of its packaging. The first and second routers 204, 206 may be from the same or different manufacturers and each may be a single or dual-band router.

According to one embodiment, to replace the first router 204 with the second router 206 according to one embodiment, the second router 206 may be placed in "client" mode (also called "bridge" mode). According to one embodiment, in client mode, the second router 208 is not configured to route network traffic. In effect, the router in client mode 208 is no longer a router, per se, it is a client computing device that is configured to search for a network AP provided by the first router 204. A predetermined protocol may then be invoked on the first and second routers 204, 208. According to one embodiment, the predetermined protocol may be configured to enable an exchange of at least the network name of the Local Area Network (LAN) and password information from the first router 204 to the second router 208 in client mode. According to one embodiment, the predetermined protocol may comprise placing the second router 206 in client mode, such as shown at 208 in FIG. 2. According to one embodiment, the predetermined protocol may comprise the WPS protocol. To invoke WPS, the user may be requested to, for example, push a button on at least the second router 206. The button may be a virtual button (a graphic of a button, for example) provided to the user via a suitable User Interface (UI) rendered on a display. Alternatively, the button may be a physical button provided on the router 206, 208. Actuation of the button, however provided or rendered, on at least router 208 may cause the first router 204 and the second router 208 in client mode to exchange, according to one embodiment, Extensible Authentication Protocol (EAP) messages. In the course of doing so, the first router 204 may provide, and the second router in client mode may receive and acknowledge receipt of, at least the network name such as the SSID and the password of the network, as shown at 210. In effect, the second router in client mode 208 may "learn" the SSID and the password of the first router 204. In receipt of the network name and password from the first router 204, the second router 208, still in client mode, may now configure itself according to the received network name and password information obtained from the first router 204, as shown at 212 in FIG. 2. Thereafter, the thus-configured second router 212, may switch from its current client mode back to router mode, as suggested at 216. The second router, now configured according to the network name and password obtained from the first router 204, may then be coupled to the network gateway device 202 as shown at (2) and the first router 204 may be powered down, de-coupled from the network gateway device 202 and removed from the LAN, as suggested at 218. The second router 216, in router mode and configured according to the network name and password, may now be configured to route traffic on the network, as a drop-in replacement for the first router 204. The so-configured second router 216 may then be tested to determine the ability thereof to route traffic on the LAN and to couple to and access the network 102.

According to one embodiment, if the first router 204 does not have a dual-band (e.g., 5 GHz as of this writing) setting, the second router in client mode 208 may use the older router's settings (network name and password) to set up the dual-band wireless network. A new network name may be generated, using the old network's name as a seed. For example, the old network name, as previously used by the first router 204, may be used, and a "5G" or "DB" (for example) designation may be appended thereto. For example, the new network name may be configured as "OLD_ NETWORK_ NAME_ 5G" or some similar designation. The password previously stored by the first router 204 may be retained by the second router 208 in client mode, for ease of access. The similar network name, with the added designation and the password previously used by the first router 204, may then be used when the router 212 is switched back into router mode as shown at 216 and coupled to the network gateway device 202.

Figure 3:
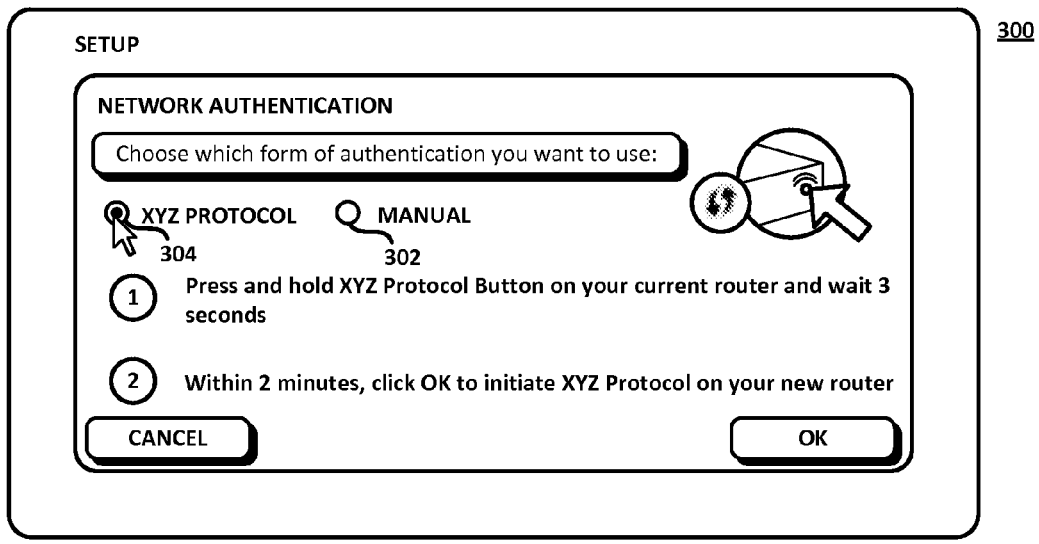
FIG. 3 shows an exemplary User Interface (UI) embodying aspects of one embodiment.

FIG. 3 shows an exemplary UI embodying aspects of one embodiment. The UI 300 may be rendered on a computing device coupled to the router 206 or, for example, on a display on the router 206, if the router is so equipped. For example, the UI may be rendered on or configured for display on a web browser. As shown, the exemplary UI 300 may provide the user with the option of manual configuration via, for example, a radio button 302. For example, the "manual mode" of configuring the router 206 may comprise reading a Personal Identification Number (PIN) from either a sticker or a display on the second router 206 and entering the PIN on the first router 202 or, for example, a Universal Serial Bus (USB) method, in which network name and password information is manually transferred to the second router 206 via a USB memory device. According to one embodiment, a particular protocol ("XYZ Protocol" in FIG. 3) may be invoked by selecting radio button 304. When the user makes a selection, further instructions appropriate to the selection may be displayed on the UI, as shown at (1) and (2) in FIG. 3. According to one embodiment, the "XYZ Protocol" may be or comprise the WPS protocol.

Figure 4:
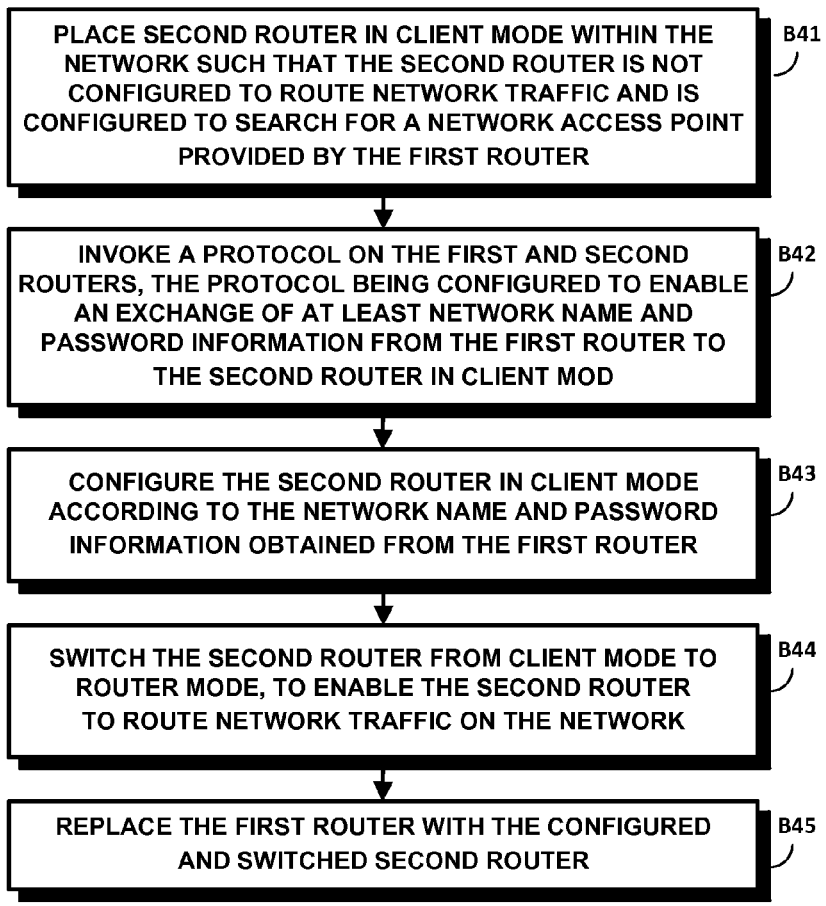
FIG. 4 is a flowchart of a method of replacing a first router with a second router within a network, according to one embodiment.

FIG. 4 is a flowchart of a method of replacing a first router with a second router within a network, according to one embodiment. As shown, Block B41 calls for placing the second router in client mode within the network such that the second router is not configured to route network traffic (such that it is no longer, at least functionally, a router) and is configured to search for a network AP provided by the first router. Block B42, as shown, calls for invoking a protocol on the first and second routers. The protocol may be configured to enable an exchange of at least network name and password information from the first router to the second router in client mode. According to one embodiment, the protocol may be configured to carry out the functionality of Block B41. In that case, Block B41 would be subsumed into Block B42. As shown at Block B43, the second router in client mode may be configured according to the network name and password information obtained from the first router. Thereafter, as shown at B44, the second router may be switched from client mode to router mode, enabling the second router to route network traffic on the network. As shown in FIG. 4, Block B45 calls for replacing the first router with the configured and switched second router, now configured according to the network name and password obtained from the first router and reconfigured in router mode. Connectivity and routing functionality may now be tested, to ensure proper operation of the second router.

According to one embodiment, the security protocol currently in force on the first router may be transferred, along with the SSID and the password, to the second router.

Figure 5:
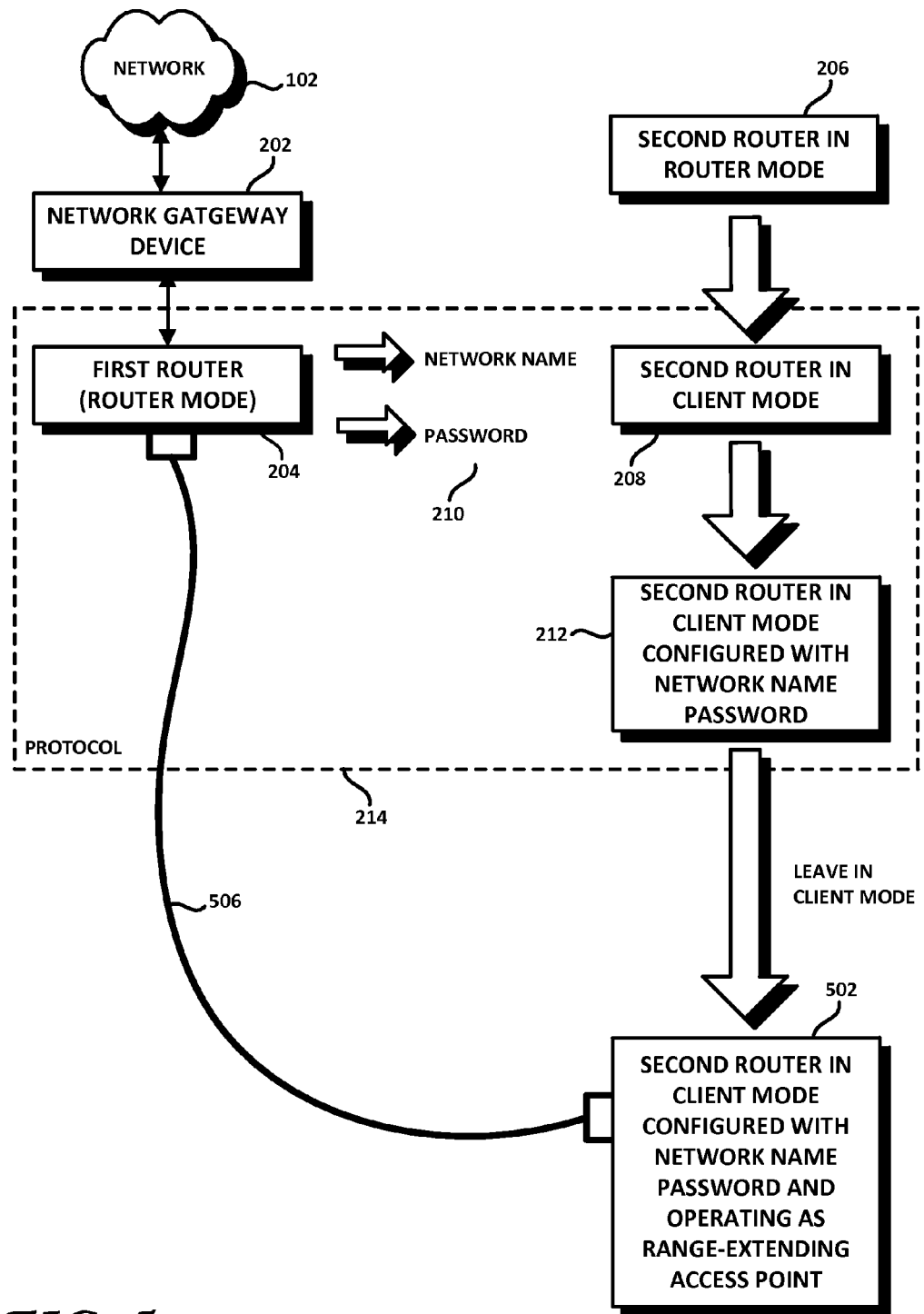
FIG. 5 is a block diagram illustrating the configuration of a second router as a range-extending Access Point (AP) on a network comprising a first router, according to one embodiment.

According to one embodiment, the new router may be configured as a range-extending AP, keeping the older router in the network. FIG. 5 is a block diagram illustrating the configuration of a second router as a range-extending AP on a network comprising a first router, according to one embodiment. As shown in FIG. 5, a network gateway 202 may be coupled to the network 102 and to a first router 204. According to one embodiment, the network gateway device 202 may be integrated with the first router 204 (or vice-versa) to form a an integrated router-modem device. A second router 206 may be provided, in the same manner as was the second router 206 in FIG. 2. According to one embodiment, the second router 206 may be placed in client mode, as shown at 208. According to one embodiment, in client mode, the second router is not configured to route network traffic. As noted above, the router in client mode 208 is, at least functionally, no longer a router, but is a client computing device that is configured to search for a network AP provided by the first router 204. A predetermined protocol may then be invoked on the first and second routers 204, 208. According to one embodiment, the predetermined protocol may be configured to enable, for example, an automated exchange of the network name of the LAN and password information from the first router 204 to the second router 208 in client mode. According to one embodiment, the predetermined protocol may comprise placing the second router 206 in client mode, such as shown at 208 in FIG. 2. For example, the predetermined protocol may comprise the WPS protocol. To invoke WPS, the user may be requested to, for example, push a button on at least the second router 206. As described relative to FIG. 2, the button may be a virtual button (a graphic of a button, for example) provided to the user via a suitable UI rendered on a display. Alternatively, the button may be a physical button provided on the router 206, 208. Actuation of the button, however provided or rendered, on at least the second router in client mode 208 may cause the first router 204 and the second router 208 in client mode to exchange messages. Via such messages, the first router 204 may provide, and the second router 208 in client mode may receive and acknowledge receipt of, at least the network name such as the SSID and the password of the network, as shown at 210. In receipt of the network name and password from the first router 204, the second router 208, still in client mode, may now configure itself according to the received network name and password information obtained from the first router 204, as shown at 212 in FIG. 5.

According to one embodiment, as shown at 502 in FIG. 5, the second router, still configured in client mode and according to the network name and password obtained from the first router 204, may be left in in client mode; and coupled to the first router 204 as a range-extending AP 502 by a connection 506. According to one embodiment, the connection 506 may comprise an Ethernet or other cable. The second router, configured as shown at 502, may be moved away from the first router 204, to an area to which the range of the first router 204 is desired to be extended. The range-extending functionality of the second router may then be tested.

Figure 6:
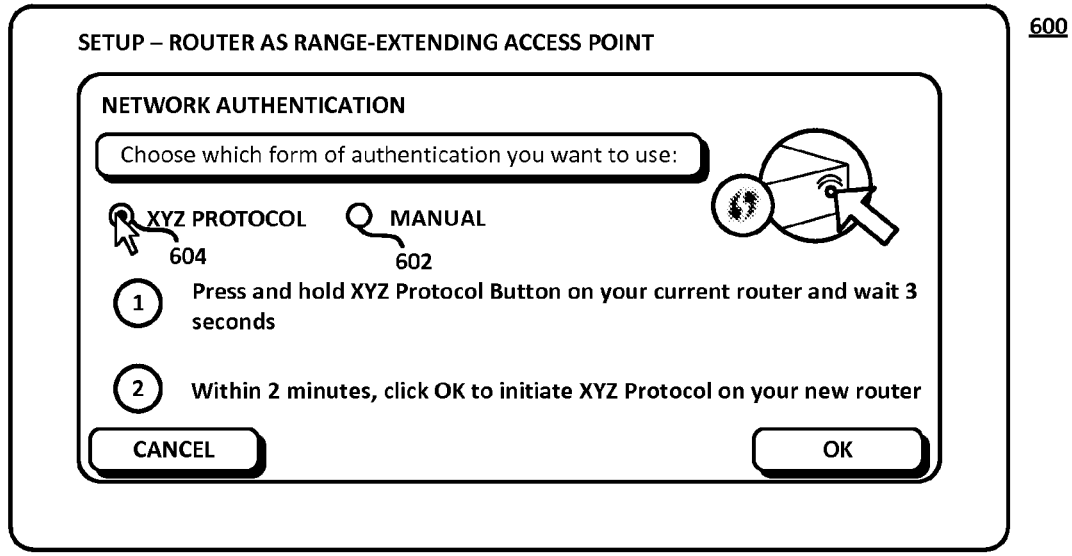
FIG. 6 shows an exemplary UI for setting up a router as a range extending access point, according to one embodiment.
Figure 7:
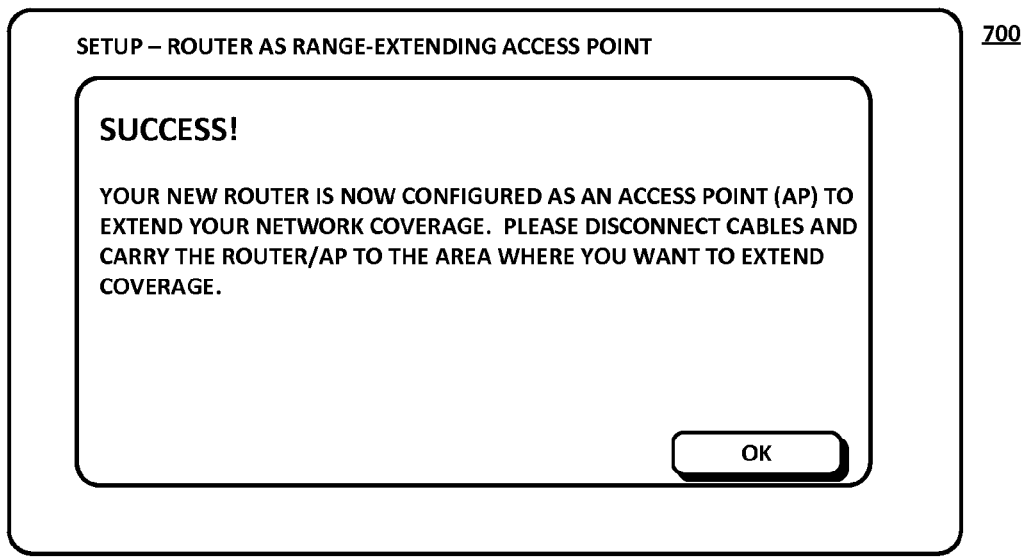
FIG. 7 shows an exemplary UI indicating success in setting up a router as a range extending access point, according to one embodiment.

FIGS. 6 and 7 show exemplary UIs configured to enable or facilitate the functionality described above. As shown in FIG. 6, the UI 600 may be rendered on a computing device coupled to the router 206. For example, the UI may be rendered on or configured for display on a web browser or on a display on one or more of the first and second routers. As shown, the exemplary UI 600 may provide the user with the option of manual configuration via, for example, a radio button 602. For example, the "manual mode" of configuring the router 206 may comprise reading a PIN from either a sticker or a display on the second router 206 and entering the PIN on the first router 204 or, for example, a Universal Serial Bus (USB) method, in which network name and password information is manually transferred to the second router 206 via a USB memory device. According to one embodiment, a particular protocol ("XYZ Protocol" in FIG. 3) may be invoked by selecting radio button 604. When the user makes a selection, further instructions appropriate to the selection may be displayed on the UI, as shown at (1) and (2) in FIG. 3. According to one embodiment, the "XYZ Protocol" may be or comprise the WPS protocol. Using the WPS protocol, according to one embodiment, the newly-purchased router may be successfully configured as an AP as shown at 502 even if the user no longer remembers the older router's SSID and/or password.

When the router 502 has been successfully configured as a range-extending AP, the UI 700 of FIG. 7 may be displayed. The UI 700 may provide further instructions for the user such as, for example, to disconnect cables and to physically carry the router—range extending AP to the area in which the user wants to extend coverage of the router 204. In this manner, even a technologically-unsophisticated user may successfully configure their new router with existing network settings and configure their new router as a range-extending AP.

Figure 8:
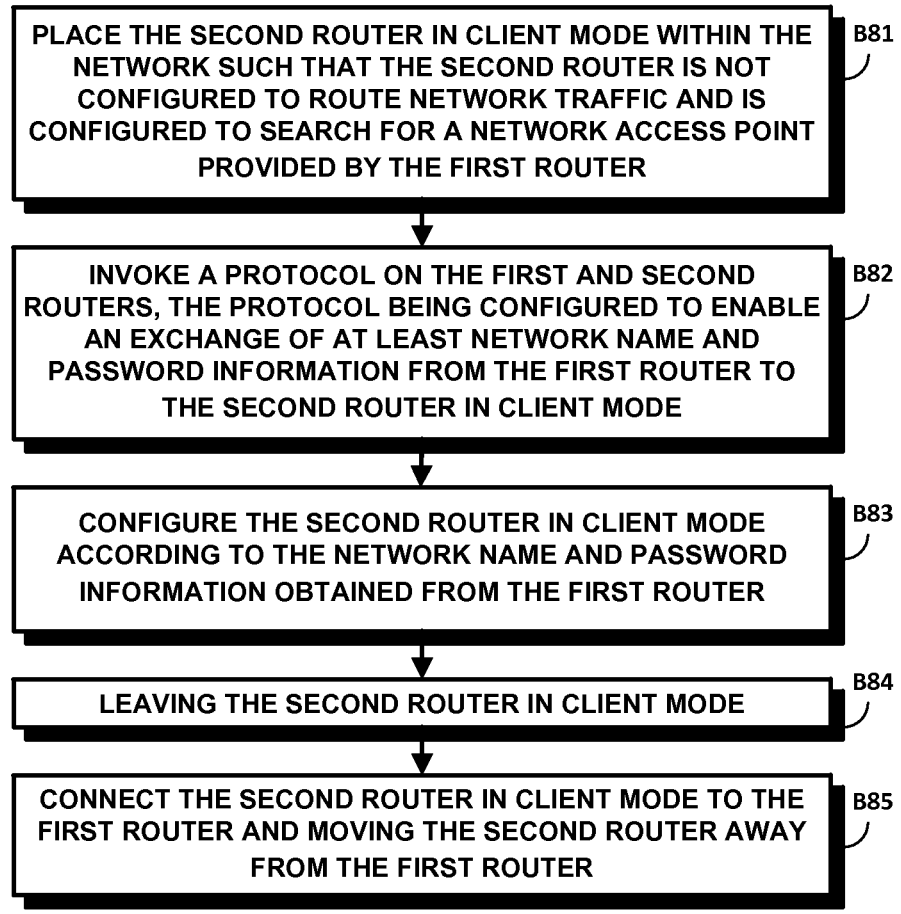
FIG. 8 is a flowchart of a method of configuring a second router as a range-extending access point on a network comprising a first router, according to one embodiment.

FIG. 8 is a flowchart of a method of configuring a second router as a range-extending access point on a network comprising a first router, according to one embodiment. As shown at B81, the second router in client mode within the network such that the second router is not configured to route network traffic and is configured to search for a network access point provided by the first router. Block B82 calls for invoking a protocol on the first and second routers. The protocol, such as WPS according to one embodiment, may be configured to enable an exchange of at least network name and password information from the first router to the second router in client mode. The second router may be configured in client mode and according to the network name and password information obtained from the first router, as shown at B83. According to one embodiment, the second router may then be left in client mode, as shown at Block B84. The second router in client mode may then be connected to the first router and moving the second router away from the first router, as shown at B85. The range-extending functionality of the second router may then be tested, as described above.

According to one embodiment, the user's "out-of-the-box" router installation experience may be greatly improved, which may lead to more satisfied (and, therefore, loyal) customers, fewer returns to the point-of-sale and fewer costly calls to customer service.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures (such as, for example,) may differ from those shown in the figures. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A method of replacing a first router with a second router within a network, comprising:
   placing the second router in client mode within the network such that the second router is not configured to route network traffic and is configured to search for a network access point provided by the first router;
   invoking a protocol on the first and second routers, the protocol being configured to enable an exchange of at least network name and password information from the first router to the second router in client mode;
   configuring the second router in client mode according to the network name and password information obtained from the first router;
   switching the second router from client mode to router mode, enabling the second router to route network traffic on the network; and
   replacing the first router with the configured and switched second router.

2. The method of claim 1, wherein the second router is comparatively newer than the first router.

3. The method of claim 1, wherein the first and second routers are from different manufacturers.

4. The method of claim 1, wherein invoking comprises actuating a button.

5. The method of claim 4, wherein the button is a physical button on at least the second router.

6. The method of claim 4, wherein the button is a virtual button rendered on a display.

7. The method of claim 1, wherein invoking comprises invoking the Wi-Fi Protected Setup (WPS) protocol.

8. The method of claim 1, wherein replacing comprises disconnecting the first router from the network.

9. The method of claim 1, further comprising testing the second router to determine an ability thereof to route traffic on the network.

10. A method of configuring a second router as a range-extending access point on a network comprising a first router, comprising:
   placing the second router in client mode within the network such that the second router is not configured to route network traffic and is configured to search for a network access point provided by the first router;
   invoking a protocol on the first and second routers, the protocol being configured to enable an exchange of at least network name and password information from the first router to the second router in client mode;
   configuring the second router in client mode according to the network name and password information obtained from the first router;
   leaving the second router in client mode; and
   connecting the second router in client mode to the first router and moving the second router away from the first router.

11. The method of claim 10, wherein the second router is comparatively newer than the first router.

12. The method of claim 10, wherein the first and second routers are from different manufacturers.

13. The method of claim 10, wherein invoking comprises actuating a button.

14. The method of claim 13, wherein the button is a physical button on at least the second router.

15. The method of claim 13, wherein the button is a virtual button rendered on a display.

16. The method of claim 10, wherein invoking comprises invoking the Wi-Fi Protected Setup (WPS) protocol.

17. The method of claim 10, wherein connecting comprises connecting a cable between the first router and the second router in client mode.

18. The method of claim 10, further comprising testing the second router to determine an ability thereof to extend a range of the first router.

19. A router configured to route network traffic in a computer network, the router being configured to:
   (1) selectively enter in a client mode in which the router is not configured to route network traffic and is configured to search for a network access point on the computer network;
   (2) while in client mode, exchange at least network name and password information with another router present on the computer network according to a protocol and self-configure according to the network name and password information obtained from the other router; and
   (3) selectively remain in client mode and operate as a range-extending access point to the other router or switch from client mode to router mode, to thereby enable the router to route network traffic on the network.

20. The router of claim 19, wherein the router is further configured to exchange at least the network name and the password information upon a button being actuated.

21. The router of claim 20, wherein the button is a physical button on the router.

22. The router of claim 20, wherein the button is a virtual button rendered on a display.

23. The router of claim 19, wherein the protocol comprises the Wi-Fi Protected Setup (WPS) protocol.

* * * * *